(12) United States Patent  (10) Patent No.: US 9,276,643 B2
Garcia et al.  (45) Date of Patent: Mar. 1, 2016

(54) MOBILE WIRELESS COMMUNICATIONS DEVICE PROVIDING NEAR FIELD COMMUNICATION (NFC) UNLOCK AND TAG DATA CHANGE FEATURES AND RELATED METHODS

(71) Applicant: BlackBerry Limited, Waterloo (CA)

(72) Inventors: Juan Martin Garcia, Mississauga (CA); Vahid Moosavi, Kitchener (CA); Ge Zhong, Richmond Hill (CA)

(73) Assignee: BlackBerry Limited, Waterloo (CA)

( * ) Notice: Subject to any disclaimer, the term of this patent is extended or adjusted under 35 U.S.C. 154(b) by 155 days.

(21) Appl. No.: 13/912,556

(22) Filed: Jun. 7, 2013

(65) Prior Publication Data

US 2014/0361872 A1  Dec. 11, 2014

(51) Int. Cl.
H04B 5/00 (2006.01)
(52) U.S. Cl.
CPC ............ *H04B 5/0062* (2013.01); *H04B 5/0031* (2013.01)
(58) Field of Classification Search
CPC . H04M 1/66; H04M 1/72569; H04M 1/7253; H04B 5/0062; H04B 5/0031; G06K 7/10297
USPC ............... 340/5.2, 5.21, 5.22, 5.24, 5.6, 5.61, 340/5.64, 5.74, 5.8; 455/41.1, 41.2
See application file for complete search history.

(56) References Cited

U.S. PATENT DOCUMENTS

| | | | |
|---|---|---|---|
| 7,515,048 B1 | 4/2009 | Bhattiprolu et al. | |
| 8,880,027 B1 * | 11/2014 | Darringer | 455/411 |
| 2005/0221798 A1 | 10/2005 | Sengupta et al. | |
| 2007/0164847 A1 | 7/2007 | Crawford et al. | |
| 2007/0204348 A1 | 8/2007 | Matsuda et al. | |
| 2009/0150294 A1 | 6/2009 | March et al. | |
| 2010/0082482 A1 | 4/2010 | Vandeburg | |
| 2010/0082490 A1 | 4/2010 | Rosenblatt et al. | |
| 2010/0091995 A1 | 4/2010 | Chen et al. | |
| 2010/0294835 A1 | 11/2010 | Bam et al. | |
| 2011/0212688 A1 | 9/2011 | Griffin et al. | |
| 2011/0214158 A1 | 9/2011 | Pasquero et al. | |
| 2011/0244964 A1 | 10/2011 | Glynne-Jones et al. | |
| 2012/0094596 A1 | 4/2012 | Tysowski | |
| 2012/0094597 A1 | 4/2012 | Tysowski | |

(Continued)

FOREIGN PATENT DOCUMENTS

| | | |
|---|---|---|
| EP | 2364006 | 9/2011 |
| GB | 2476989 | 7/2011 |

OTHER PUBLICATIONS

Configuring Password Policies; Jan. 2009.*

(Continued)

*Primary Examiner* — Nabil Syed

(74) *Attorney, Agent, or Firm* — Ridout and Maybee LLP

(57) ABSTRACT

A mobile wireless communications device may include a near field communication (NFC) transceiver and a controller coupled with the NFC transceiver. The controller may be configured to receive tag data from at least one NFC tag when in close proximity thereto via the NFC transceiver, verify the tag data, and when the tag data is successfully verified, perform at least one device unlock operation. The controller may be further configured to determine whether the tag data should be changed based on a predetermined schedule, and if it is determined that the tag data should be changed, communicate with the at least one NFC tag to change the tag data.

19 Claims, 9 Drawing Sheets

(56) References Cited

U.S. PATENT DOCUMENTS

2012/0207305 A1    8/2012    Gallo et al.
2012/0218075 A1    8/2012    Hill
2012/0322370 A1    12/2012    Lee

OTHER PUBLICATIONS

U.S. Appl. No. 13/912,539, filed Jun. 7, 2013.

U.S. Appl. No. 13/648,576, filed Oct. 10, 2012: Inventor Yu Tang.

* cited by examiner

MOBILE WIRELESS COMMUNICATIONS DEVICE PROVIDING NEAR FIELD COMMUNICATION (NFC) UNLOCK AND TAG DATA CHANGE FEATURES AND RELATED METHODS

TECHNICAL FIELD

This application relates to the field of communications, and more particularly, to mobile wireless communications systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile communications devices. This short-range high frequency wireless communications technology exchanges data between devices over a short distance, such as only a few centimeters.

DETAILED DESCRIPTION

Figure 1:
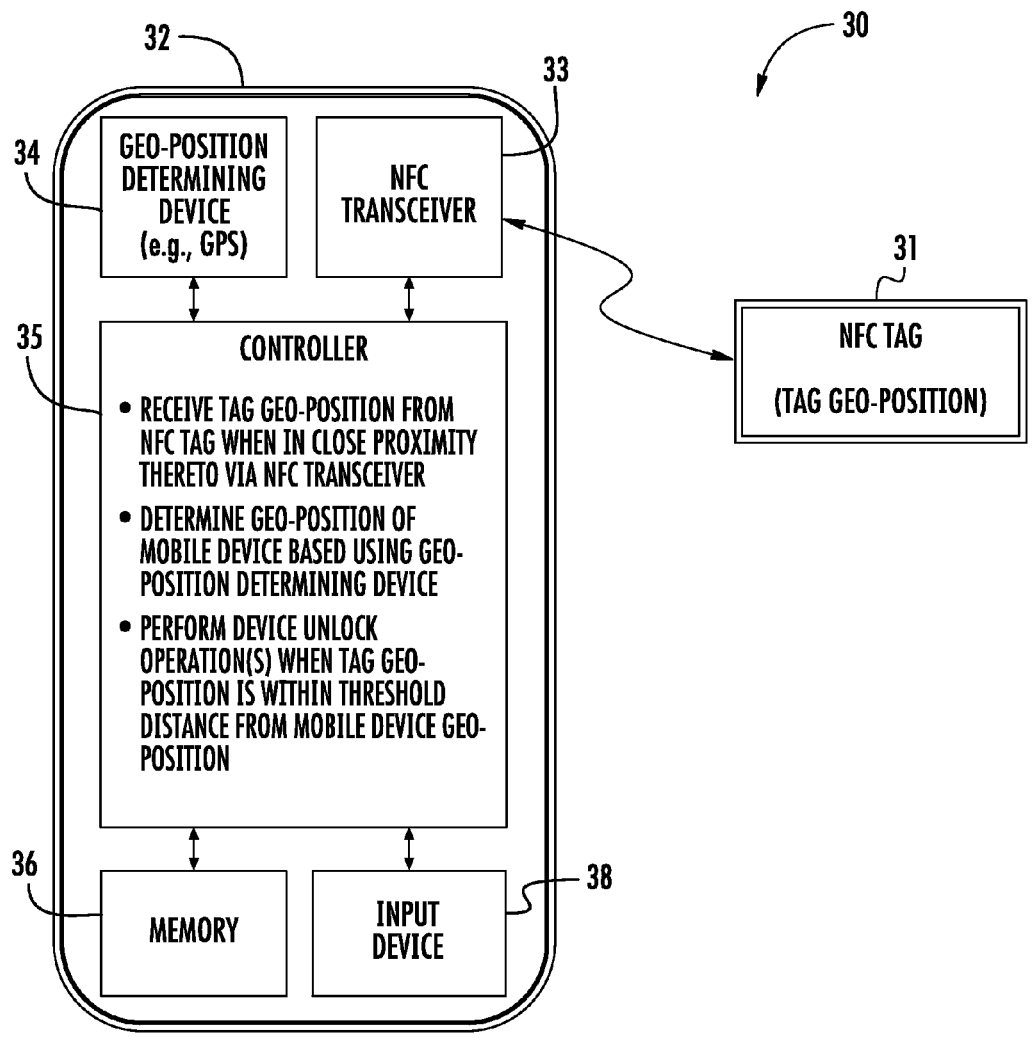
FIG. 1 is a schematic block diagram of a system in accordance with an example embodiment providing near field communication (NFC) mobile device unlocking features.

The present description is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a mobile wireless communications device is provided herein which may include a near field communication (NFC) transceiver and a controller coupled with the NFC transceiver. The controller may be configured to receive tag data from at least one NFC tag when in close proximity thereto via the NFC transceiver, verify the tag data, and when the tag data is successfully verified, perform at least one device unlock operation. The controller may be further configured to determine whether the tag data should be changed based on a predetermined schedule, and if it is determined that the tag data should be changed, communicate with the at least one NFC tag to change the tag data.

By way of example, the predetermined schedule may be based upon a number of device unlock operations since the tag data was last changed, a passage of time since the tag data was last changed, etc. The unlock operation may include unlocking the mobile wireless communications device itself, or any part or feature thereof. For example, the mobile wireless communications device may further include a memory coupled with the controller and configured to store office data, and the at least one device unlock operation may comprise unlocking access to the office data in the memory. In another example embodiment, the memory may be configured to store home data, and the at least one device unlock operation may comprise unlocking access to the home data in the memory. Furthermore, the controller may be configured to change the tag data based upon an encryption key, a message authentication key, etc.

The predetermined schedule may be modified by input received through one or more input devices associated with the mobile wireless communications device, or through other wired or wireless communication links. For example, the mobile wireless communications device may further include one or more input devices coupled with the controller, and the controller may be further configured to change the predetermined schedule based upon input received through the input device(s). The controller may also be configured to change the tag data based upon input received through the input device(s).

In one example embodiment, the at least one NFC tag may comprise a plurality of NFC tags each having respective tag data associated therewith. Furthermore, the controller may perform the at least one device unlock operation based upon a sequence in which the respective tag data is received.

A related method is for using a mobile wireless communications device, such as the one described briefly above. The method may include receiving tag data from at least one NFC tag when in close proximity thereto via the NFC transceiver, verifying the tag data, and when the tag data is successfully verified, performing at least one device unlock operation. The method may further include determining whether the tag data should be changed based on a predetermined schedule, and if it is determined that the tag data should be changed, communicating with the at least one NFC tag to change the tag data.

A related non-transitory computer-readable medium is for a mobile wireless communications device, such as the one described briefly above. The non-transitory computer-readable medium may have computer-executable instructions for causing the mobile wireless communications device to receive tag data from at least one NFC tag when in close proximity thereto via the NFC transceiver, verify the tag data, and when the tag data is successfully verified, perform at least one device unlock operation. The non-transitory computer-readable medium may also have computer-executable instructions for causing the mobile wireless communications device to determine whether the tag data should be changed based on a predetermined schedule, and if it is determined that the tag data should be changed, communicate with the at least one NFC tag to change the tag data.

Figure 2:
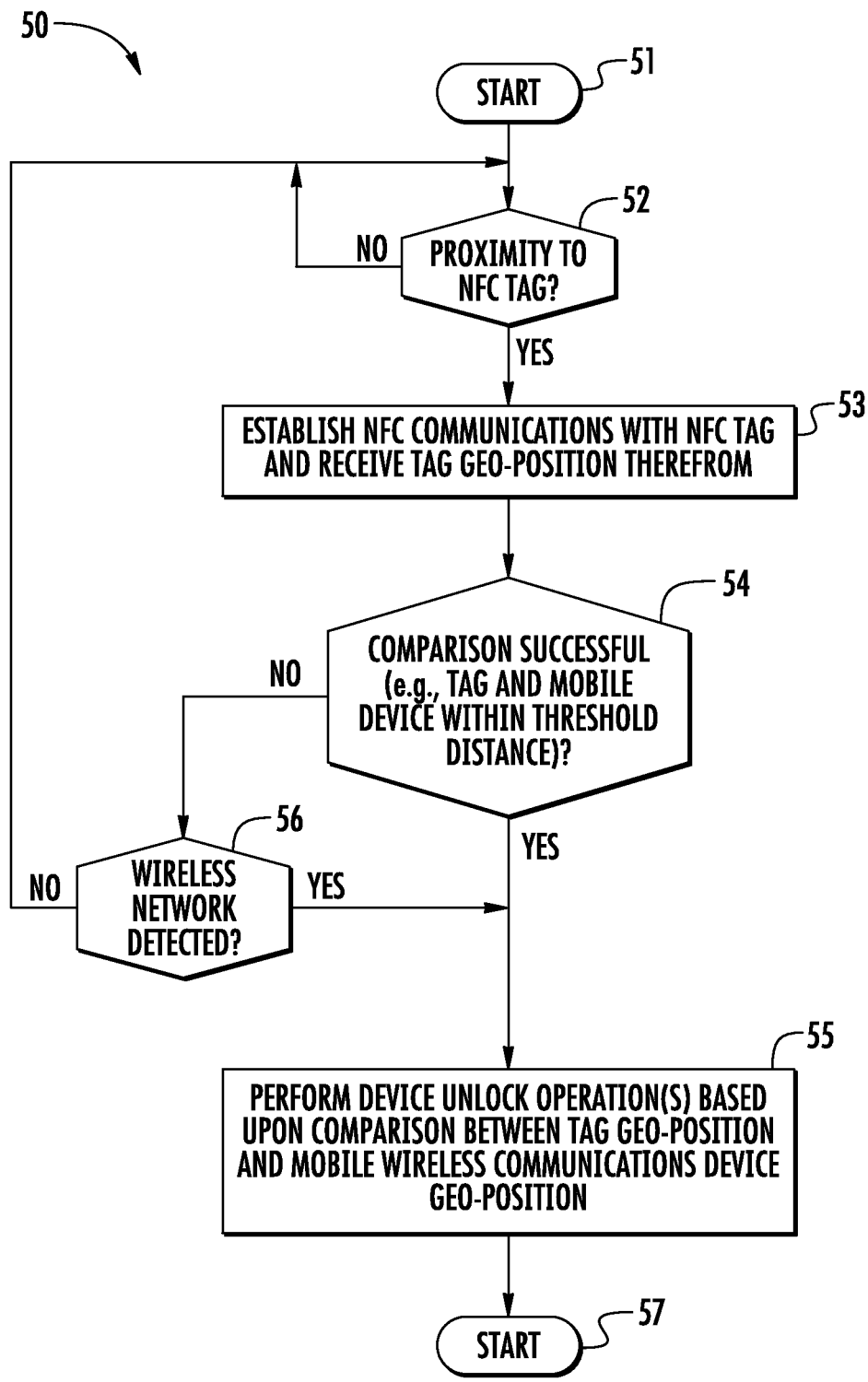
FIG. 2 is a flow diagram illustrating method aspects associated with the system of FIG. 1.

Referring initially to FIG. 1 and the flow diagram 50 of FIG. 2, a system 30 and related method aspects are first described. The system 30 illustratively includes a near field communication (NFC) tag or token 31, and a mobile wireless communications device 32 (also referred to as a "mobile device" herein). In the illustrated example, the NFC tag 31 is a passive tag, although in other embodiments the NFC tag may be an active device, as will be appreciated by those skilled in the art. The mobile device 32 illustratively includes an NFC transceiver 33, a geo-position determining device 34 configured to determine a mobile wireless communications device geo-position, and a controller 35 coupled with the NFC transceiver and geo-position determining device.

Example mobile devices 32 may include portable or personal media players (e.g., music or MP3 players, video players, etc.), portable gaming devices, portable or mobile telephones, smartphones, tablet computers, digital cameras, etc. The geo-position determining device may include a Global Positioning System (GPS) receiver, for example, although other suitable position determining systems (e.g., GLONASS, Galileo, etc.) may also be used in different embodiments. The controller 35 may be implemented using a combination of hardware (e.g., microprocessor, etc.) and a non-transitory computer-readable medium having computer-executable instructions for causing the mobile device 32 to perform the various operations discussed herein.

By way of background, NFC is a short-range wireless communications technology in which NFC-enabled devices are "swiped," "bumped", "tapped" or otherwise moved in close proximity to communicate. In one non-limiting example implementation, NFC may operate at 13.56 MHz and with an effective range of several centimeters (typically up to about 4 cm, or up to about 10 cm, depending upon the given implementation), but other suitable versions of near field communication which may have different operating frequencies, effective ranges, etc., for example, may also be used.

Security may be an important consideration for mobile devices, as they are often taken outside of a trusted area (e.g., home or office) where they can be lost or stolen. Password-based security is a common approach to securing a mobile device so that unauthorized users cannot operate or obtain access to data stored on the mobile device. Yet, password-based security may be problematic, as it may become bothersome to users and may therefore be disabled by users, or users may select relatively simple passwords that are easily guessed or compromised.

Another approach that may be used, either instead of password protection or in combination with password protection or other security approaches, is NFC-based security. That is, NFC tags may be used to unlock one or more functions or data on a mobile device upon being swiped therewith. However, one potential drawback of NFC tags is that they may be considered insecure. More particularly, typical NFC tags may be read by any NFC-enabled reader. The approaches set forth herein may advantageously be used to take advantage of the conveniences of NFC-based mobile device unlocking, for example, yet while helping to overcome the drawbacks associated with typical NFC tags.

Beginning at Block 51 of flow diagram 50, the controller 35 may be configured to cause the NFC transceiver 33 to establish NFC communications with the NFC tag 31 when in proximity thereto and receive a tag geo-position therefrom, at Blocks 52-53. More particularly, the tag geo-position may be stored in a memory (not shown) of the tag to indicate its authorized location, such as the geo-position of the user's home or office building, for example. The controller 35 may accordingly perform one or more device unlock operations based upon a comparison between the tag geo-position and the mobile device 32 geo-position, at Blocks 54-55. That is, the controller 35 may determine whether the geo-position reported by the NFC tag 31 is within a threshold distance of the current geo-position of the mobile device 32 as determined by the geo-position determining device 34. If so, then the NFC tag 32 may be successfully authenticated and one or more mobile device operations may be performed. The controller 35 may also check for a unique identifier (e.g., a serial number, etc.) associated with the NFC tag 31. That is, the controller 35 may require that a given tag (as indicated by its unique identifier) is present in a given location (as indicated by its tag geo-position data) before performing the mobile device unlock operation(s). In such examples, a tag's unique identifier may be read by the mobile device along with the tag geo-position data.

As such, the mobile device 32 may verify the tag geo-position data before performing a device unlock operation for enhanced security. This may be particularly helpful in an effort to avoid cloning of the NFC tag 31 by an unauthorized person, with the intent of taking possession of the mobile device 32 and gaining access to it at a separate, unauthorized location, for example. More particularly, when the NFC tag 31 is at a trusted location, such as a home or office location, it may accordingly be assumed with a relatively high degree of confidence that the owner of the mobile device 32 or an authorized user is in possession of the mobile device.

If the comparison of the geo-position data from the NFC tag 31 and the geo-position determining device 34 does not result in a successful match (i.e., they are not within the threshold distance of one another), then the controller 35 may require an additional level of information to complete a device lock operation(s). For example, the controller 35 may then require a valid password to be provided via an input device 37. Another additional security check is that the controller 35 may determine if the mobile device 32 is within range of a known wireless communications network, such as a wireless local area network (WLAN), a designated cellular tower, etc., at Block 56. This may be helpful where the geo-position of the NFC tag 31 is relatively close to, but outside of, the designated threshold distance.

In this way, the geo-position of the NFC tag 31 may be considered as a correlation coefficient of an overall security algorithm to determine an acceptable confidence level associated with performing a requested unlocking operation. That is, if the geo-position data of the NFC tag 31 is successfully authenticated, then the confidence level may be considered sufficiently high enough that further authentication checks (e.g., password, detection of a known wireless network, etc.) need not be performed, to thereby expedite the unlock operation and increase the ease of use for the user. The method of FIG. 2 illustratively concludes at Block 57.

Various unlock operations which may be performed as a result of the above-described geo-position comparison will now be described. An initial unlock operation may be to simply unlock the mobile device from a locked or sleep mode, for example, in which a display 37 is not illuminated to conserve power, for example. The locked mode may be entered automatically by the controller 35 after an inactivity period (which may be user-configurable), or manually by a user by pushing a designated button on the mobile device (not shown), etc., for example. Upon being unlocked from a locked mode, the controller 35 may generally allow access to most, if not all, of the operations of the mobile device 32, such as playing audio/video, phone calls, text messaging, etc. However, in addition to using the NFC tag 31 to perform a general device unlock, one or more NFC tags may be used to perform more specific or specialized unlocking operations in addition to, or instead of, a general mobile device unlock.

Figure 3:
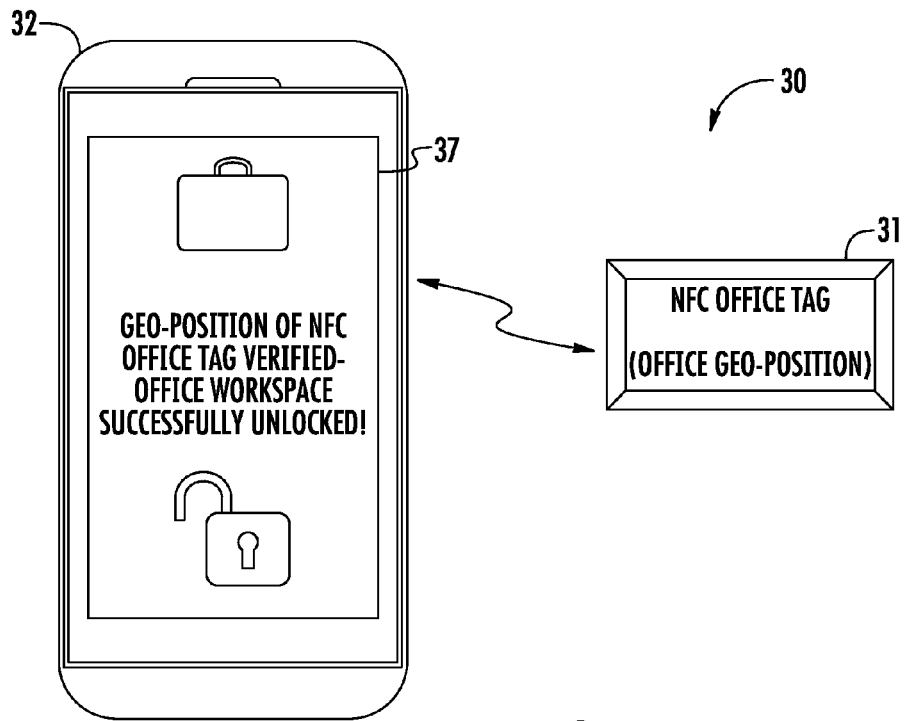
FIGS. 3-5 are schematic block diagrams of the system of FIG. 1 illustrating different mobile device unlocking operations that may be performed.

Referring additionally to FIG. 3, the mobile device 32 may further include a memory 36 (e.g., flash memory, etc.) coupled with the controller 35 and configured to store data in accordance with different designated categories. In the example of FIG. 3, office or work data is stored in the memory 36, which may include electronic mail (email) messages, documents, images, etc., associated with a user's job or profession. This categorization of data as office data may conceptually be considered as a "workspace", such that when the controller 35 unlocks the office workspace then the user is granted access to the email account(s), documents, etc. which are within the office workspace. Moreover, to perform NFC-based unlocking of the office workspace as described above, the office data may be associated with an office location, e.g., the geo-position of the user's designated office building. This association may be made during configuration of the NFC tag 31 with the controller 35 for performing the office unlock operation, such as by performing the configuration operation in the user's office and determining the current geo-position from the geo-position determining device 34, for example. However, the geo-position for an office or other desired location may be obtained by different approaches, such as through an interactive geo-referenced map, etc. The NFC tag 31 configuration or provisioning may be performed using an NFC tag programming app installed on the mobile device 32, for example.

Accordingly, the NFC office tag 31 may, for example, be positioned at a convenient location at or within the user's office building, so that when the user arrives at work and swipes the mobile device 32 with the NFC office tag the controller 35 may unlock access to the office data in the memory 36. In the illustrated example, the mobile device 32 further includes a display 37, upon which the controller 35 causes a message to be displayed indicating that the office workspace has been successfully unlocked for use.

Figure 4:
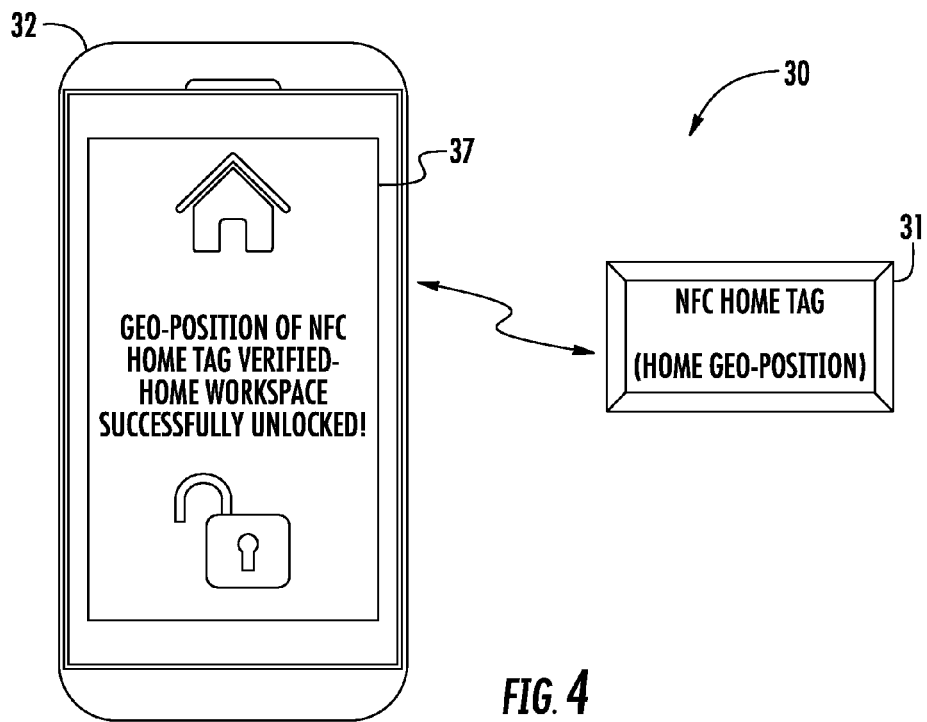

Another similar example is illustrated in FIG. 4, in which the memory 36 is configured to store home data associated with a home location. That is, the home data may be considered personal data such as personal email accounts, audio/video, documents, etc., that are categorized as part of a home or personal workspace, for example. As such, the NFC tag 31 geo-position data may be associated with a home location of the user, and the controller 35 may accordingly unlock access to the home data in the memory 36 upon receipt of the home geo-position data from the NFC home tag. Here again, a notification message is provided on the display 37 indicating that the home workspace has been successfully unlocked for use.

Figure 5:
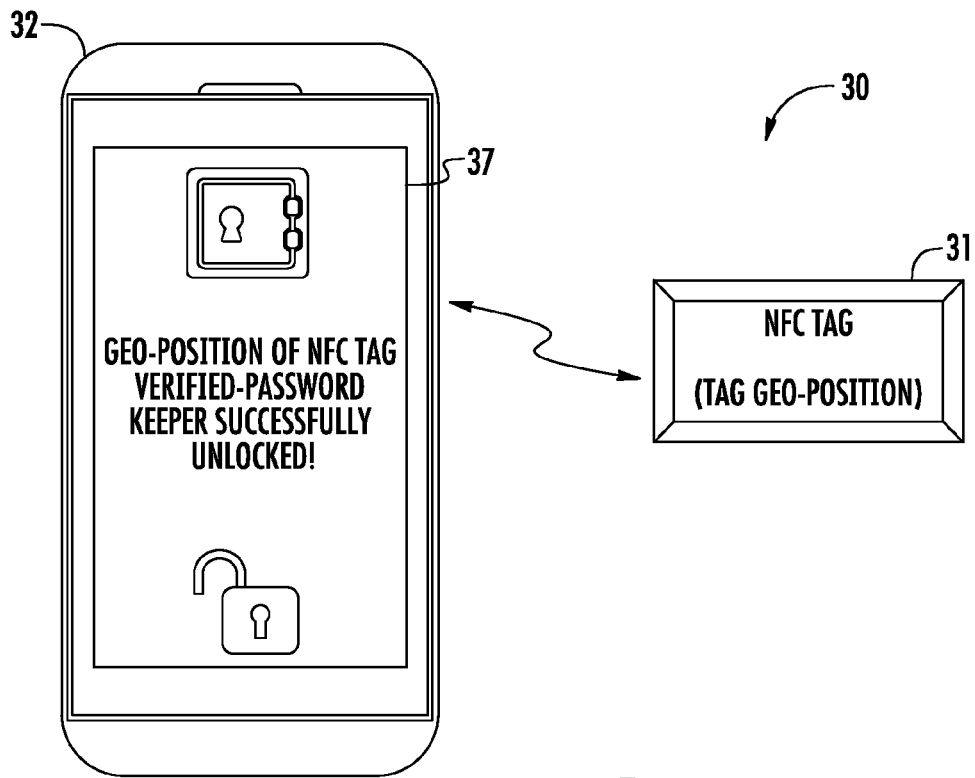

In still another example embodiment now described with reference to FIG. 5, the memory 36 may be configured to store one or more passwords, such as in a password keeper app, for example. Thus, upon receiving the appropriate tag geo-position data from the NFC tag 31, the controller 35 may unlock access to the password(s) stored in the memory 36. Once again, a notification message on the display 37 may be provided to indicate that the password keeper app has successfully been unlocked for use, as shown, although it should be noted that a notification message need not be provided to indicate successful unlocking if desired. Moreover, in some embodiments the controller 35 may also cause the display 37 to provide a notification when a requested unlock operation is not successful, and may optionally provide an explanation as to the reason the unlock operation was denied, if desired.

Another potential location for the NFC tag 31 may be within a vehicle, for example. While a vehicle may be readily moved between different locations, unlike a home or office building, in such an implementation the tag geo-position may correspond to one or more locations in a given area, such as a route between home and work, for example. Accordingly, to perform authentication of the NFC tag 31 in a vehicle, for example, the controller 35 may use the geo-position determining device 34 to determine if its current location is within a threshold distance of a location along the designated route, for example.

Figure 6:
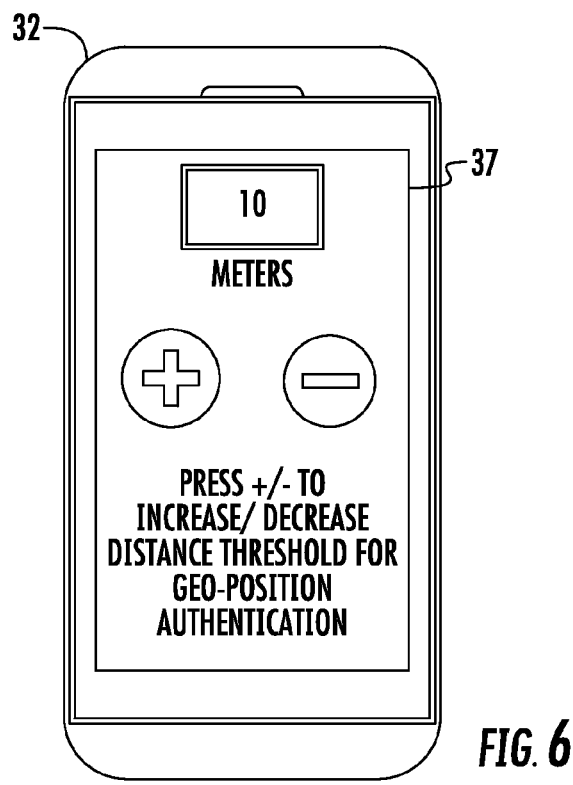
FIG. 6 is a front view of an example embodiment of the mobile device of FIG. 1 illustrating selection of an adjustable distance threshold for use with the NFC-based unlocking features.

As noted above, the controller 35 may be configured to perform the at least one device unlock operation based upon the tag geo-position and the mobile device 32 geo-position being within a distance threshold thereof. The mobile device 32 may further include an input device 38 coupled with the controller 35, and the controller may be configured to change the distance threshold based upon the input device. Referring now to the example illustrated in FIG. 6, the input device 38 is the display 37 implemented in a touch screen configuration. The user may accordingly touch the "+" or "−" regions on the display 37 to increase or decrease the distance threshold for geo-position authentication, as shown. However, it should be noted that other input devices may also be used in different embodiments (e.g., keypad, buttons, track pad, etc.).

In some embodiments, the threshold distance comparison may be performed based upon a sliding scale, such as by using a gradient function, for example. For example, if the distance differential is within the threshold distance, then unlocking may be performed without further authentication credential information. If the differential is outside of, but within 10% of, the threshold distance, then a supplemental authentication operation of checking for a local network, as described above, may then also be performed. If the differential is greater than this, a password may be required, for example. However, other configurations may also be used. Moreover, it should also be noted that the threshold distance could be set by someone other than the user in some embodiments. For example, the mobile device 32 may be configured such that the threshold distance may be set by an information technology (IT) professional, a carrier network, or the manufacturer of the mobile device 32.

As noted above, typical NFC tags that are configured to unlock a mobile device, etc., are relatively insecure. Yet, the above-described approach helps to increase the security of the NFC tag 31, and thereby improve the overall level of security for the mobile device 32. While an unauthorized person may be able to steal the geo-position data off the NFC tag 31 at a given time, and then steal the mobile device 32 and go to a different place to try to unlock the mobile device using the data in a "cloned" NFC tag, the above-described approach may nonetheless help prevent the thief from unlocking the mobile device.

Figure 7:
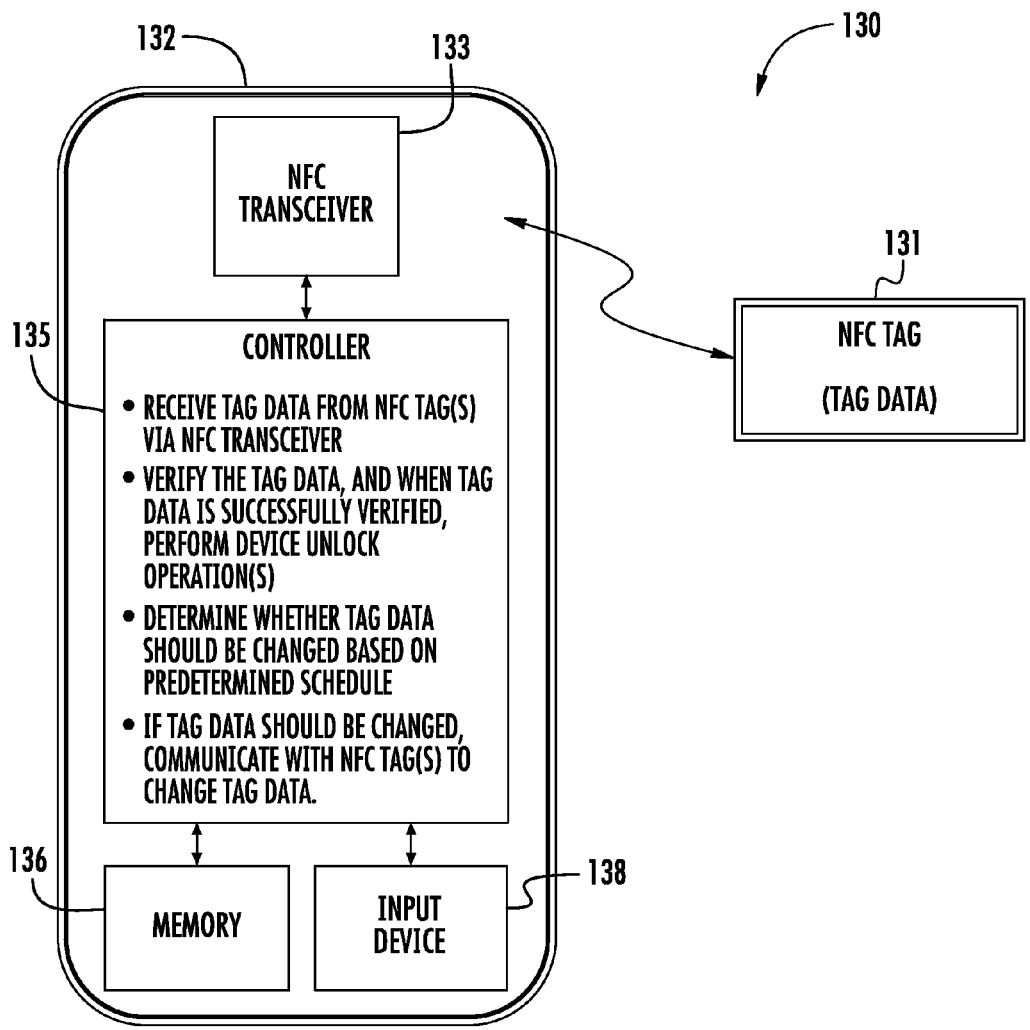
FIG. 7 is a schematic block diagram of another system in accordance with an example embodiment providing NFC device unlock features.
Figure 8:
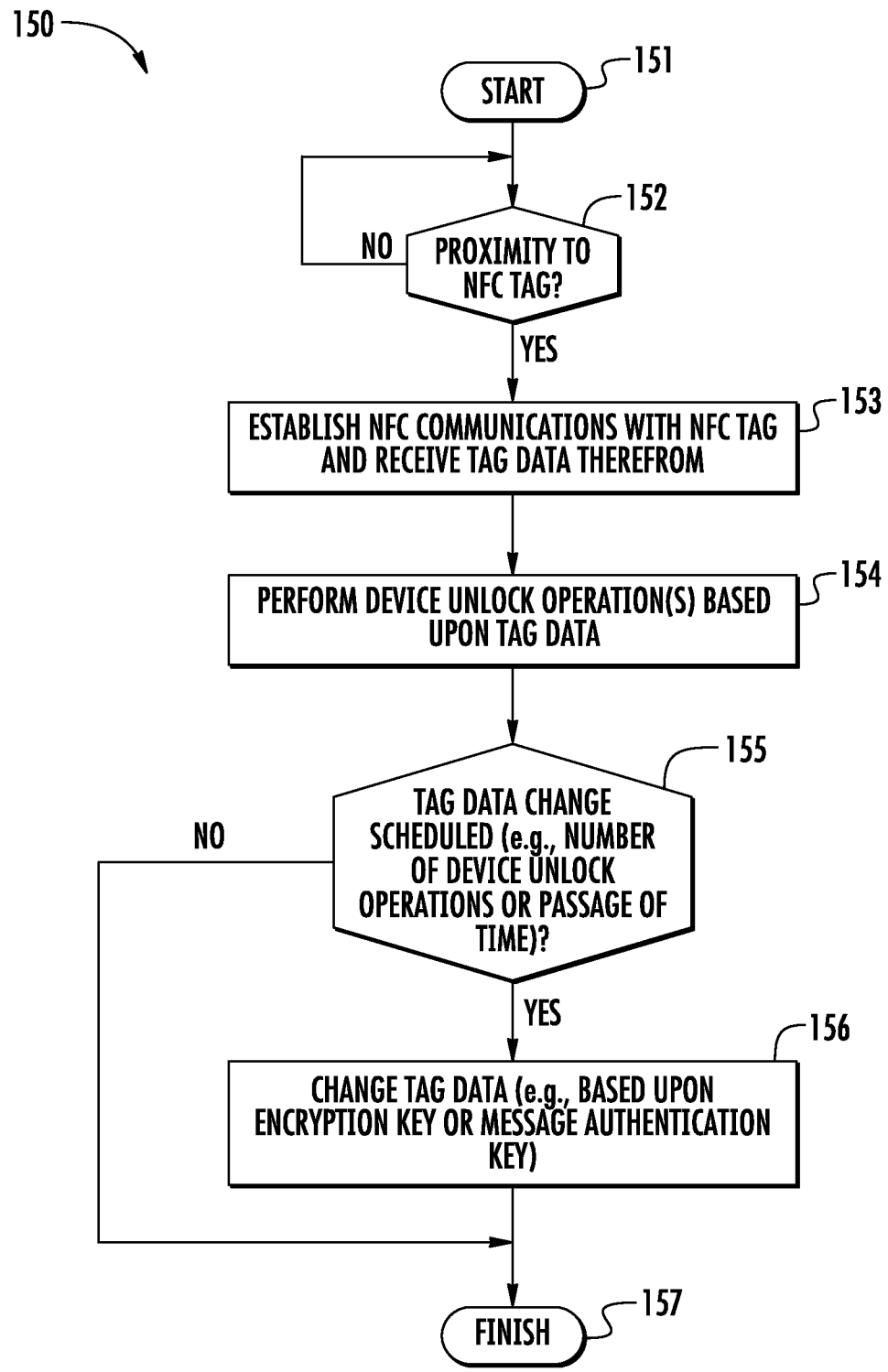
FIG. 8 is a flow diagram illustrating method aspects associated with the system of FIG. 7.

Referring now to the system 130 of FIG. 7 and the flow diagram 150 of FIG. 8, another NFC tag-based unlock configuration and associated method aspects are now described. The system 130 illustratively includes an NFC tag 131 and a mobile device 132, which are similar to those described above with reference to FIG. 1. More particularly, the mobile device 132 illustratively includes an NFC transceiver 133, controller 135, memory 136, and an input device(s) 138, which may be similar to those described above. Beginning at Block 151, the controller 135 may be configured to cause the NFC transceiver 133 to establish NFC communications with one or more NFC tags 131 when in proximity thereto and receive tag data therefrom, at Blocks 152 and 153. Furthermore, the controller 135 may be configured to perform one or more device unlock operations, such as those described above, based upon the tag data, at Block 154. However, to provide additional security, the controller 135 may also be configured to communicate with the NFC tag(s) 131 to change the tag data based upon a schedule, at Blocks 155-156, which illustratively concludes the method of FIG. 8 (Block 157). For example, the schedule could require that the tag data be changed every x number of days or after a given number of unlock operations have occurred.

Accordingly, this may help prevent surreptitious attempts to clone the NFC tag to thereby unlock the mobile wireless communications device without permission. More particularly, changing or refreshing the tag data based upon a schedule may be conceptually considered as the physical equivalent of changing locks on a door, except that with an NFC tag this may be done through software/data storage operations on various different schedules. Moreover, in some embodiments, upon the occurrence of the scheduled tag data change, the user may at that point may be required to provide additional authentication information (e.g., a password, etc.) to authorize use of the NFC tag 131 for unlocking until the next scheduled tag data change.

By way of example, the controller 135 may change the tag data based upon an encryption key or a message authentication key. More particularly, in one example embodiment an encryption key/message authentication key pair may be used to re-encrypt the tag data and re-compute a message authentication code (MAC). The newly computed encrypted data and its MAC may be stored at the NFC tag 131. The actual encryption key and message authentication key may be stored in a secure area in the mobile device 132, such as a secure element, for example. Generally speaking, a MAC is a relatively short piece of information used to authenticate a message and to provide integrity and authenticity assurances with respect to the message, i.e., to detect accidental or intentional message changes, and to affirm the message's origin. A MAC algorithm, such as a keyed (cryptographic) hash function, accepts as an input a secret key and a message to be authenticated, and outputs a MAC. The MAC value allows verifiers (who also possess the secret key) to detect any changes to the message content. Various encryption algorithms may be used, including symmetric-key algorithms such as AES, for example. It should be noted that other approaches may also be used for changing the data, such as pseudorandom numbers, etc.

Figure 9:
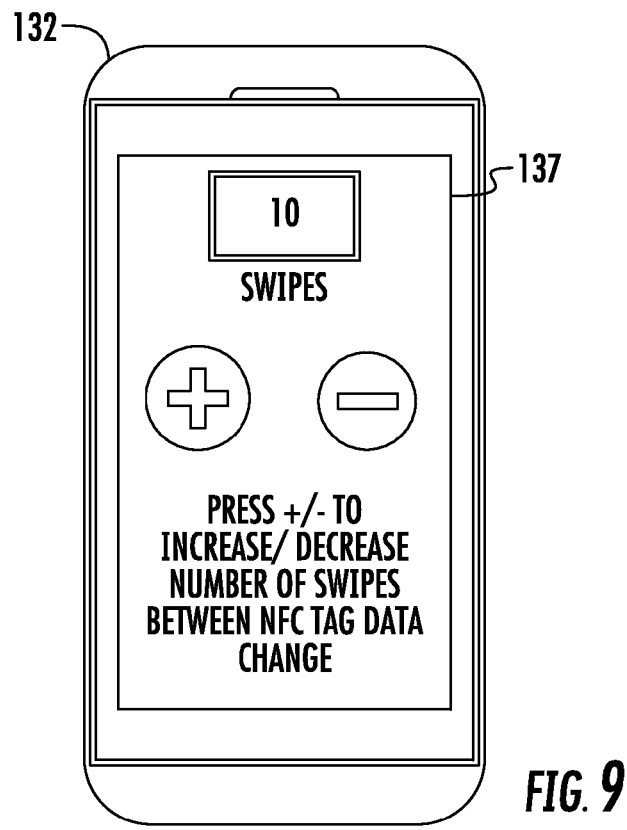
FIGS. 9-10 are front views of an example embodiment of the mobile device of FIG. 7 illustrating selection of NEC tag data change parameters.

Referring additionally to FIG. 9, the schedule may be based upon a number of device unlock operations performed. In the illustrated example, the mobile device 132 includes a display 137 upon which a graphical user interface (GUI) is provided to allow the user to set the number of device unlock operations to be performed between tag data changes. More particularly, this is presented to the user as the number of "swipes" that are to be performed with the given NFC tag 131 before its tag data is changed. In the present example, the number is set to ten swipes. Thus, every tenth time a successful authentication is performed with the NFC tag 131, the mobile device 132 will provide new tag data to the NFC tag, which may be written over the old tag data, for example. It should be noted that other numbers of swipes or authentications greater than or less than ten may be used. For example, the frequency may be configured to every time there is a successful authentication (i.e., a value of 1), which would provide the strongest level of security, although this may result in a longer overhead time, particularly if each tag data refresh is to be accompanied by another form of authentication (e.g., a password) as noted above. An example range which may provide a balance between desired security without increased overhead on every swipe may be to perform the tag data change in a range of every 4 to 10 swipes, although other ranges may be used.

Figure 10:
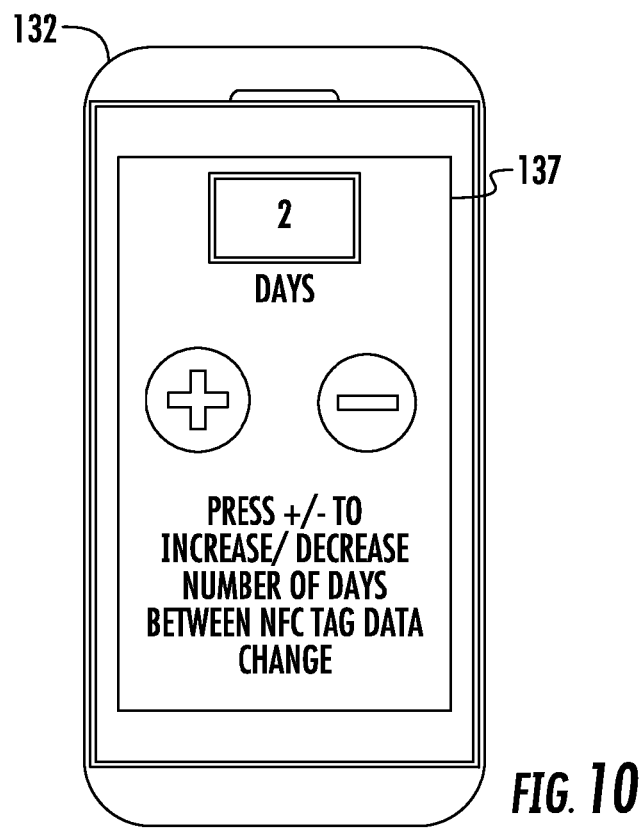

In accordance with another example now described with reference to FIG. 10, the schedule may be based upon the passage of time. By way of example, the updated tag data may be written to the NFC tag 131 after a given number of days. In the illustrated example, the selected time period is two days, although more or less time, as well as other time intervals (e.g., hours, weeks, etc.), may also be used. This embodiment may be useful where the owner of the mobile device 132 (e.g., a parent) desires to authorize use of the mobile device to another (e.g., a child) for a limited time. Thus, the child would be able to use the NFC tag 131 to unlock the mobile device 132 until the next scheduled tag data change, at which point a re-authorization by the parent (e.g., password entry, etc.) would be required to continue for unlocking via the NFC tag, if re-authorization is used in the given embodiment.

It should also be noted that the input device 138 may also be used to cause an unscheduled or manual change of the tag data. Thus, for example, if the user wanted to trigger a change to the tag data prior to the next scheduled change, this may be accomplished through an on-screen menu, etc., if desired. This may be helpful where the user believes a security threat may be likely, or where the user wishes to revoke a previously-granted access, for example.

Figure 11:
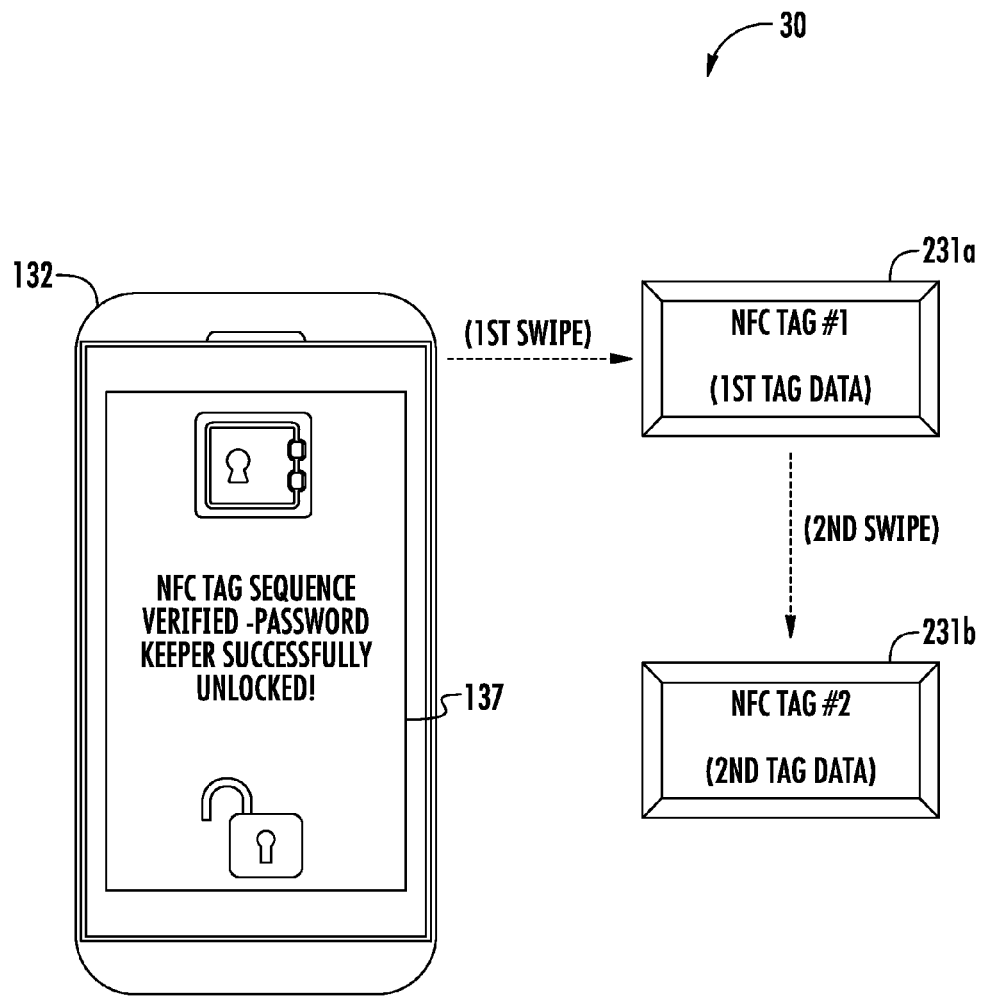
FIG. 11 is a schematic block diagram of the system of FIG. 7 in which multiple NFC tags are used for providing NFC-based unlocking features.

Turning now to FIG. 11, in another example embodiment a plurality of NFC tags 231a, 231b may each have respective tag data associated therewith, and the controller 135 may perform the given device unlock operation based upon a sequence in which the respective tag data is received. That is, the controller 135 may require that the NFC tags 231a, 231b are tapped or swiped in the correct order to perform the requested unlock operation. In the illustrated example, this order is to first swipe the NFC tag 231a, and then the NFC tag 231b. In some embodiments, the controller 135 may require that the correct sequence also be performed within a certain period of time, e.g., a duration between swipes of the NFC tags 231a, 231b cannot exceed X seconds, or the swipe sequence cannot take more than a total overall time of Y seconds to complete. Each of the NFC tags 231a, 231b may have its own refresh schedule, if desired.

It should also be noted that the various features described above with reference to FIGS. 1-6 may also be combined with the configurations discussed with respect to FIGS. 7-11. For example, a given NFC tag may have both tag geo-position data and changeable key or identification data, and thus unlock authentication may be performed using both of these features in some embodiments.

Example components of a mobile communications device 1000 that may be used in accordance with the above-described embodiments are further described below with reference to FIG. 12. The device 1000 illustratively includes a housing 1200, a keyboard or keypad 1400 and an output device 1600. The output device shown is a display 1600, which may include a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 12:
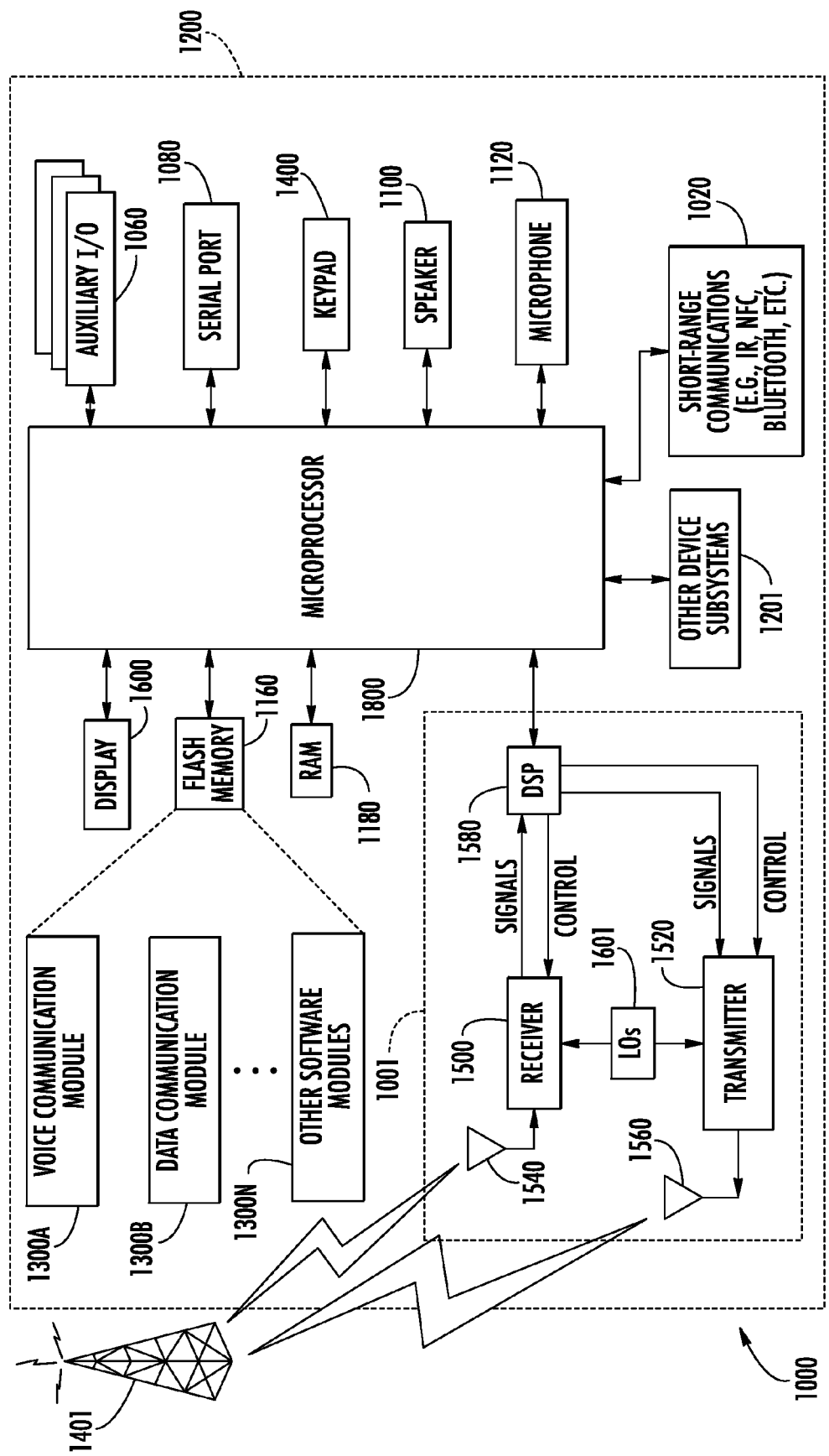
FIG. 12 is a schematic block diagram illustrating example components which may be used with the mobile wireless communications devices of FIGS. 1, 3-7, and 10-11.

In addition to the processing device 1800, other parts of the mobile device 1000 are shown schematically in FIG. 12. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may include a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, LTE, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) sensor for communicating with a NFC device or NFC tag via NFC communications.

Many modifications and other embodiments will come to the mind of one skilled in the art having the benefit of the That which is claimed is:

1. A mobile wireless communications device comprising:
a near field communication (NFC) transceiver, an input device, a geo-position determining device; and a controller coupled with said input device, said geo-position determining device, and said NFC transceiver and configured to:
receive tag data from at least one NFC tag when in close proximity thereto via the NFC transceiver, the tag data including a geo-position of the at least one NFC tag;
verify the tag data, and when the tag data is successfully verified and the mobile wireless communications device is within a threshold distance of the geo-position of the at least one NFC tag, perform at least one device unlock operation,
determine whether the tag data should be changed based on a predetermined schedule, the predetermined schedule being changeable with said input device; and
when it is determined that the tag data should be changed, communicate with the at least one NFC tag to change the tag data.

2. The mobile wireless communications device of claim 1 wherein the predetermined schedule is based upon a number of device unlock operations since the tag data was last changed.

3. The mobile wireless communications device of claim 1 wherein the predetermined schedule is based upon a passage of time since the tag data was last changed.

4. The mobile wireless communications device of claim 1 further comprising a memory coupled with said controller and configured to store office data; and wherein the at least one device unlock operation comprises unlocking access to the office data in said memory.

5. The mobile wireless communications device of claim 1 further comprising a memory coupled with said controller and configured to store home data; and wherein the at least one device unlock operation comprises unlocking access to the home data in said memory.

6. The mobile wireless communications device of claim 1 wherein said controller is configured to change the tag data based upon an encryption key.

7. The mobile wireless communications device of claim 1 wherein said controller is configured to change the tag data based upon a message authentication key.

8. The mobile wireless communications device of claim 1 wherein said controller is further configured to change the tag data based upon said input device.

9. The mobile wireless communications device of claim 1 wherein the at least one NFC tag comprises a plurality of NFC tags each having respective tag data associated therewith; and wherein said controller performs the at least one device unlock operation based upon a sequence in which the respective tag data is received.

10. A method for using a mobile wireless communications device comprising a near field communication (NFC) transceiver and a geo-position determining device, the method comprising:
receiving tag data from at least one NFC tag when in close proximity thereto via the NFC transceiver, the tag data including a geo-position of the at least one NFC tag;
verifying the tag data, and when the tag data is successfully verified and the mobile wireless communications device is within a threshold distance of the geo-position of the at least one NFC tag, performing at least one device unlock operation;
determining whether the tag data should be changed based on a predetermined schedule, the predetermined schedule being changeable with an input device of said mobile wireless communications device; and
when it is determined that the tag data should be changed, communicating with the at least one NFC tag to change the tag data.

11. The method of claim 10 wherein the predetermined schedule is based upon a number of device unlock operations since the tag data was last changed.

12. The method of claim 10 wherein the predetermined schedule is based upon a passage of time since the tag data was last changed.

13. The method of claim 10 wherein the mobile wireless communications device further comprises a memory configured to store office data;
and wherein the at least one device unlock operation comprises unlocking access to the office data in the memory.

14. The method of claim 10 wherein the mobile wireless communications device further comprises a memory configured to store home data; and wherein the at least one device unlock operation comprises unlocking access to the home data in the memory.

15. A non-transitory computer-readable medium for a mobile wireless communications device comprising a near field communication (NFC) transceiver and a geo-position determining device, the non-transitory computer-readable medium having computer-executable instructions for causing the mobile wireless communications device to:
receive tag data from at least one NFC tag when in close proximity thereto via the NFC transceiver, the tag data including a geo-position of the at least one NFC tag;
verify the tag data, and when the tag data is successfully verified and the mobile wireless communications device is within a threshold distance of the geo-position of the at least one NFC tag, perform at least one device unlock operation;
determine whether the tag data should be changed based on a predetermined schedule, the predetermined schedule being changeable with an input device of said mobile wireless communications device; and
when it is determined that the tag data should be changed, communicate with the at least one NFC tag to change the tag data.

16. The non-transitory computer-readable medium of claim 15 wherein the predetermined schedule is based upon a number of device unlock operations since the tag data was last changed.

17. The non-transitory computer-readable medium of claim 15 wherein the predetermined schedule is based upon a passage of time since the tag data was last changed.

18. The non-transitory computer-readable medium of claim 15 wherein the mobile wireless communications device further comprises a memory configured to store office data; and wherein the at least one device unlock operation comprises unlocking access to the office data in the memory.

19. The non-transitory computer-readable medium of claim 15 wherein the mobile wireless communications device further comprises a memory configured to store home data; and wherein the at least one device unlock operation comprises unlocking access to the home data in the memory.

* * * * *